A. OISTER.
PARACHUTE DEVICE.
APPLICATION FILED JAN 6, 1914.
1,138,140. Patented May 4, 1915.
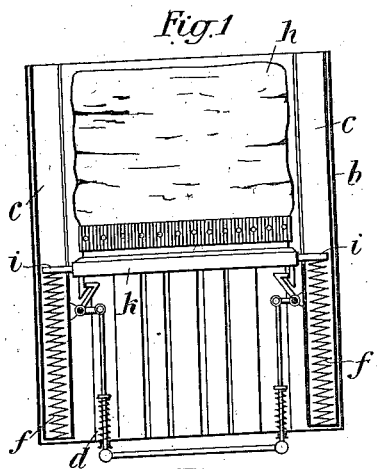
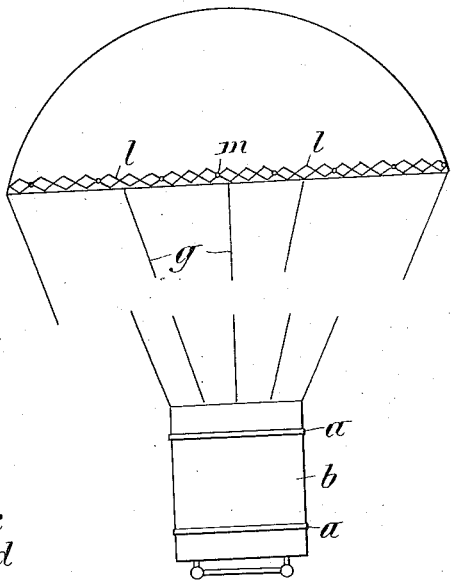
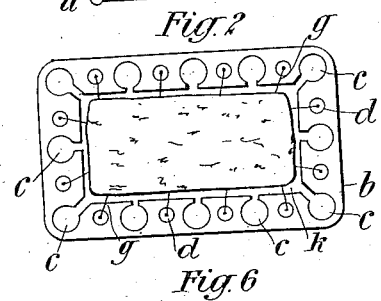
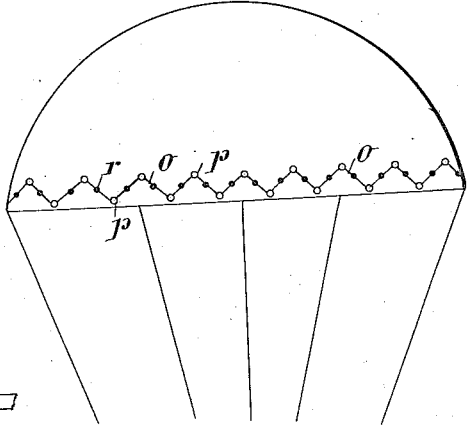
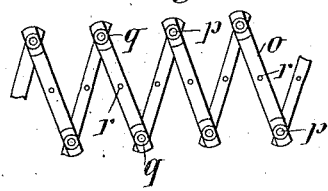
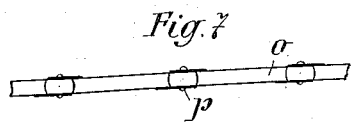
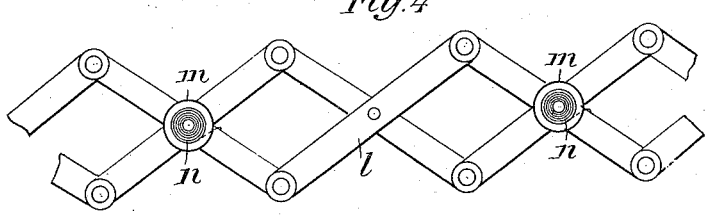
Witnesses:
Inventor:
Anton Oister
per
Attorney.

UNITED STATES PATENT OFFICE.

ANTON OISTER, OF UNTER SISKA, NEAR LAIBACH, AUSTRIA-HUNGARY.

PARACHUTE DEVICE.

1,138,140.

Specification of Letters Patent. Patented May 4, 1915.

Application filed January 6, 1914. Serial No. 810,594.

*To all whom it may concern:*

Be it known that I, ANTON OISTER, subject of the Emperor of Austria-Hungary, residing at Unter Siska, near Laibach, in the Empire of Austria-Hungary, have invented certain new and useful Improvements in Parachute Devices, of which the following is a specification.

The present invention relates to a parachute device more particularly for use in connection with aircraft.

The object of the present invention is to provide an improved parachute device which shall be very simple in construction and reliable in operation and one that can be easily carried on the back of the user and also easily mounted on an aerial craft.

The parachute according to the present invention is adapted to be brought into the operative position by means of a single handle only or by the tilting movement of the air craft.

The present invention resides in the provision on the material forming the periphery of the parachute, of pivoted links, which may be lazy-tongs adapted to be contracted when the parachute is in the collapsed condition and therefore take up very little space; while when the collapsed parachute is opened, the lazy-tongs open automatically by means of springs provided on the articulations, and in this manner open the parachute.

Two embodiments of the parachute according to the present invention are shown by way of example, in the accompanying drawing, in which:

Figure 1 is a side elevation of one form of the device partly in section. Fig. 2 is a plan of the parachute in the collapsed condition. Fig. 3 shows the parachute in the open condition. Fig. 4 illustrates a detail. Fig. 5 shows the second form of the parachute device in the open condition, while Figs. 6 and 7 are a front elevation and a plan respectively of a portion of the mechanism for opening the parachute.

In carrying the invention into effect as illustrated in Figs. 1 to 4, the parachute proper is housed in a casing or box $b$ adapted to be secured on the back of the user by means of straps $a$ or the like. This casing $b$ has its lateral walls formed with two groups of tubes $c$ and $d$, of which the tubes $c$ serve to receive the coiled springs $f$ and the tubes $d$ to receive the suitably rolled-up carrying cords $g$ of the parachute proper $h$. The tubes $c$ are closed by the extensions $i$ of the bottom $k$ movable within the casing, which also places the springs $f$ under tension; the bottom being retained by a suitable readily detachable locking device. On the periphery of the parachute proper $h$, lazy-tongs $l$ are provided according to this construction, which at all the crossing points are also provided with springs $n$ each inclosed in a casing $m$, these springs tending to open or extend the lazy-tongs. When not in use the lazy-tongs are contracted against the action of the springs $n$, and the parachute together with the contracted lazy-tongs is housed within the casing on the movable bottom $k$ which is retained in a position placing the springs $f$ under tension. When this retaining device is released, the springs $f$ project the bottom $k$ with the parachute mounted thereupon, out of the casing, so that the said parachute is thus completely thrown out therefrom. The lazy-tongs open owing to the action of the springs $n$ and at the same time also open the parachute which remains connected to the casing by means of the cords $g$ withdrawn from the tubes $d$.

According to the modification illustrated in Figs. 5 to 7, the mechanism for opening the parachute, instead of consisting of lazy-tongs, consists of a plurality of rods or the like $o$, which are connected at their ends, by means of pins $p$ so as to form a rim. On these pins, springs are provided in suitable casings $q$, which have the tendency to turn the rods $o$ toward one another in such a manner that they form an angle of about 180° between their members. Each member $o$ is secured, about in the center, at $r$, to the periphery of the parachute $h$ in such a manner that it can pivot about the point at which it is secured. In the collapsed condition of the parachute, the members are contracted in a zig-zag manner similarly to a contracted rule, so that the rim formed by the rods takes up very little space and the parachute connected with this rim can thus be housed in the casing. When the parachute is released, however, the springs located in the casings $q$ come into action whereby the rim is fully extended and the parachute is opened. By means of this arrangement the weight of the parachute is considerably reduced. This factor is of great importance as the weight of the parachute forms an undesirable load which is considered for the sake of safety only, particularly as more than one may be carried on the aircraft.

The casing housing the parachute may be constructed in various other ways than that described and illustrated. The same applies to the receiving receptacle. The arrangement of its parts may also be varied. The said receptacle may also be constructed in such a manner as to form a part of the aerial craft, the releasing device being adapted to be operated, if desired, by the falling movement of the aeroplane.

What I claim and desire to secure by Letters Patent of the United States is:—

1. Apparatus of the character described, comprising in combination a parachute, a receptacle adapted to normally contain the parachute in a collapsed condition, means connecting the parachute to the container, a locking device normally retaining the parachute within the receptacle, means for releasing the locking device, lazy-tongs provided on the periphery of the parachute, and springs at the joints of the lazy-tongs for the purpose of automatically expanding the lazy-tongs when the parachute leaves the container, for the purpose specified.

2. Apparatus of the character described, comprising in combination a parachute, a receptacle adapted to normally contain the parachute in a collapsed condition, means connecting the parachute to the container, a locking device normally retaining the parachute within the receptacle, means for releasing the locking device, means for causing the parachute to leave the container when the locking device is released, lazy-tongs provided on the periphery of the parachute, springs at the joints of the lazy-tongs for the purpose of automatically expanding the lazy-tongs when the parachute leaves the container, and means for securing the apparatus upon the back of the user, for the purpose specified.

3. Apparatus of the character described, comprising in combination a parachute, a receptacle adapted to normally contain the parachute in a collapsed condition, means connecting the parachute to the container, a locking device normally retaining the parachute within the receptacle, means for releasing the locking device, lazy-tongs provided on the periphery of the parachute, springs at the joints of the lazy-tongs for the purpose of automatically expanding the lazy-tongs when the parachute leaves the container, and means for securing the apparatus upon the back of the user, for the purpose specified.

4. Apparatus of the character described, comprising in combination a parachute, a receptacle adapted to normally contain the parachute in a collapsed condition, cords connecting the parachute to the container, a locking device normally retaining the parachute within the receptacle, means for releasing the locking device, means for causing the parachute to be projected automatically from the container upon release of the locking device, lazy-tongs provided on the periphery of the parachute, springs at the joints of the lazy-tongs for automatically extending the lazy-tongs when the parachute leaves the container, and means for securing the apparatus upon the back of the user, for the purpose specified.

5. In a device of the kind described, the combination of a parachute, a receptacle adapted to normally contain the parachute in a collapsed condition in order to house the parachute in a small space when inoperative, cords connecting the parachute to the container, a locking device normally retaining the parachute within the receptacle, means for releasing the locking device, means within the container for automatically projecting the parachute surface therefrom upon release of the locking device, an automatically extensible rim on the periphery of the parachute comprising a plurality of members pivotally connected together at their ends, pivots upon which each of these members are mounted disposed at the centers of these members and adapted to connect them to the parachute and springs mounted at the joints of these members for automatically extending the rim when the parachute leaves the container, and straps for securing the apparatus upon the back of the user, for the purpose specified.

In testimony whereof I affix my signature in presence of two witnesses.

ANTON OISTER.

Witnesses:
   IGNAZ STANONIK,
   IVAN SIMONCIS.